(12) United States Patent
Seo et al.

(10) Patent No.: US 8,565,333 B2
(45) Date of Patent: Oct. 22, 2013

(54) PRECODING MATRIX DESIGN METHOD FOR MULTIPLE BASE STATION USING MIMO TECHNIQUE

(75) Inventors: Bangwon Seo, Daejeon (KR); Young Jo Ko, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 229 days.

(21) Appl. No.: 13/058,593

(22) PCT Filed: Aug. 10, 2009

(86) PCT No.: PCT/KR2009/004447
§ 371 (c)(1),
(2), (4) Date: Feb. 11, 2011

(87) PCT Pub. No.: WO2010/018958
PCT Pub. Date: Feb. 18, 2010

(65) Prior Publication Data
US 2011/0135024 A1 Jun. 9, 2011

(30) Foreign Application Priority Data

Aug. 11, 2008 (KR) .................. 10-2008-0078460
Mar. 26, 2009 (KR) .................. 10-2009-0025734

(51) Int. Cl.
*H04B 7/02* (2006.01)
*H04L 1/02* (2006.01)

(52) U.S. Cl.
USPC .......................................... 375/267; 375/261

(58) Field of Classification Search
USPC ........................................................ 375/267
See application file for complete search history.

(56) References Cited

U.S. PATENT DOCUMENTS

| 8,249,511 | B2 * | 8/2012 | Liu et al. ...................... 455/63.1 |
| 2008/0080637 | A1 * | 4/2008 | Khan et al. .................... 375/267 |
| 2009/0154588 | A1 * | 6/2009 | Chen et al. .................... 375/267 |
| 2009/0207822 | A1 * | 8/2009 | Kim et al. ...................... 370/338 |
| 2009/0285156 | A1 * | 11/2009 | Huang et al. .................. 370/328 |
| 2010/0238824 | A1 * | 9/2010 | Farajidana et al. ........... 370/252 |
| 2010/0309998 | A1 * | 12/2010 | Jung et al. ..................... 375/260 |
| 2011/0034192 | A1 * | 2/2011 | Lim et al. ...................... 455/501 |
| 2011/0134782 | A1 * | 6/2011 | Akimoto et al. .............. 370/252 |

FOREIGN PATENT DOCUMENTS

| KR | 10-0790092 | 12/2007 |
| KR | 1020080037398 | 4/2008 |

* cited by examiner

*Primary Examiner* — Erin File
(74) *Attorney, Agent, or Firm* — Nelson Mullins Riley & Scarborough LLP

(57) ABSTRACT

Provided is a precoding matrix design method for a cooperative communication of multiple base stations in a multiple input multiple output (MIMO) communication system. A method of designing a precoding matrix in a base station of the MIMO communication system may include: determining whether to use a cooperative communication; verifying a cooperative base station when the cooperative communication is determined to be used; selecting a precoding matrix to be applied by a home base station and the cooperative base station; and requesting the home base station and the cooperative base station for the cooperative communication using the selected precoding matrix.

16 Claims, 5 Drawing Sheets

Fig. 3

| HOME BASE STATION | DESIRED RESOURCE BLOCK INDEX | TERMINAL | FIRST BASE STATION PRECODING MATRIX | SECOND BASE STATION PRECODING MATRIX | NUMBER OF LAYERS |
|---|---|---|---|---|---|
| FIRST BASE STATION (210) | $k_0$ | THIRD TERMINAL (216) | $P_{n_1}$ | | 1 |
| | | SECOND TERMINAL (214) | $P_{n_0}$ | | 2 |
| | | FIRST TERMINAL (212) | $P_{n_0}$ | $Q_{m_0}$ | 1 |
| SECOND BASE STATION (220) | $k_0$ | FOURTH TERMINAL (222) | $P_{n_0}$ | $Q_{m_0}$ | 2 |
| | | FIFTH TERMINAL (224) | | $Q_{m_0}$ | 1 |
| | | SIXTH TERMINAL (226) | | $Q_{m_1}$ | 2 |

PRECODING MATRIX DESIGN METHOD FOR MULTIPLE BASE STATION USING MIMO TECHNIQUE

RELATED APPLICATIONS

This application is a 35 U.S.C. §371 national stage filing of PCT Application No. PCT/KR2009/004447 filed on Aug. 10, 2009, which claims priority to, and the benefit of, Korean Patent Application No. 10-2008-0078460 filed on Aug. 11, 2008 and Korean Patent Application No. 10-2009-0025734 filed on Mar. 26, 2009. The contents of the aforementioned applications are hereby incorporated by reference.

TECHNICAL FIELD

The present invention relates to a precoding matrix design method for a cooperative communication of multiple base stations in a multiple input multiple output (MIMO) communication system, and more particularly, to a method of designing a precoding matrix used when a base station transmits data to another terminal included in a different cell for a cooperative communication in a system where a terminal may receive the same data from a plurality of base stations using the same radio resource.

BACKGROUND ART

In a multiple input multiple output (MIMO) communication scheme, in order to transmit data to a random terminal, only a base station of a cell including the random terminal may transmit the data to the random terminal. The MIMO communication scheme is generally referred to as a single base station MIMO communication scheme. A performance of a system using the single base station MIMO communication scheme may be limited due to an interference signal from a neighboring cell using the same resource. In particular, an inter-cell interference signal may be very large in a terminal adjacent to a cell boundary and thus the performance of the system using the single base station MIMO communication scheme may be further limited.

Currently, a multi-base station MIMO communication scheme is proposed to make neighboring base stations cooperate with each other to transmit data to a random terminal. In the multi-base station MIMO communication scheme, a plurality of base stations may share data and channel information associated with the terminal, and may simultaneously transmit the data to the terminal using the same radio resource. Through this, it is possible to enhance a data throughput of the terminal included in a cell boundary.

Accordingly, proposed is a method that may design a precoding matrix suitable for a multi-base station MIMO communication scheme, and may generate control information shared between a terminal and a base station to more effectively perform the multi-base station MIMO communication scheme.

DISCLOSURE OF INVENTION

Technical Problem

An aspect of the present invention provides a precoding matrix design method for a cooperative communication of multiple base stations in a multiple input multiple output (MIMO) communication system.

Another aspect of the present invention also provides a method of designing a precoding matrix used when a base station transmits data to another terminal included in a different cell for a cooperative communication in a system where a terminal may receive the same data from a plurality of base stations using the same radio resource.

Another aspect of the present invention also provides a method of requesting, by a terminal of a MIMO communication system, a home base station and a cooperative base station to perform a cooperative communication using a desired precoding matrix.

Another aspect of the present invention also provides a method of selecting and precoding the same number of column vectors as the number of layers sequentially from the last column vector of a precoding matrix, when a base station of a MIMO communication system receives a request for a cooperative communication for a terminal included in a different cell.

Solution to Problem

According to an aspect of the present invention, there is provided a method of designing a precoding matrix in a terminal of a multiple input multiple output (MIMO) communication system, the method including: determining whether to use a cooperative communication; verifying a cooperative base station when the cooperative communication is determined to be used; selecting a precoding matrix to be applied by a home base station and the cooperative base station; and requesting the home base station and the cooperative base station for the cooperative communication using the selected precoding matrix.

According to another aspect of the present invention, there is provided a method of designing a precoding matrix in a base station of a MIMO communication system, the method including: receiving a request for a cooperative communication; verifying a precoding matrix of a cooperative base station and the number of layers, when the request is associated with operating as the cooperative base station; and selecting and precoding the same number of column vectors as the number of layers, sequentially from the last column vector of the precoding matrix of the cooperative base station.

Advantageous Effects of Invention

According to embodiments of the present invention, there may be provided a precoding matrix design method for a cooperative communication of multiple base stations in a multiple input multiple output (MIMO) communication system, the method including: determining whether to use a cooperative communication; verifying a cooperative base station when the cooperative communication is determined to be used; selecting a precoding matrix to be applied by a home base station and the cooperative base station; and requesting the home base station and the cooperative base station for the cooperative communication using the selected precoding matrix. Accordingly, it is possible to enhance a data throughput at a cell boundary for a user and an average cell data throughput.

BRIEF DESCRIPTION OF DRAWINGS

FIG. 3 is a table illustrating an example where a terminal designs a precoding matrix of a home base station including the terminal and a cooperative base station according to an embodiment of the present invention;

MODE FOR THE INVENTION

Figure 1:
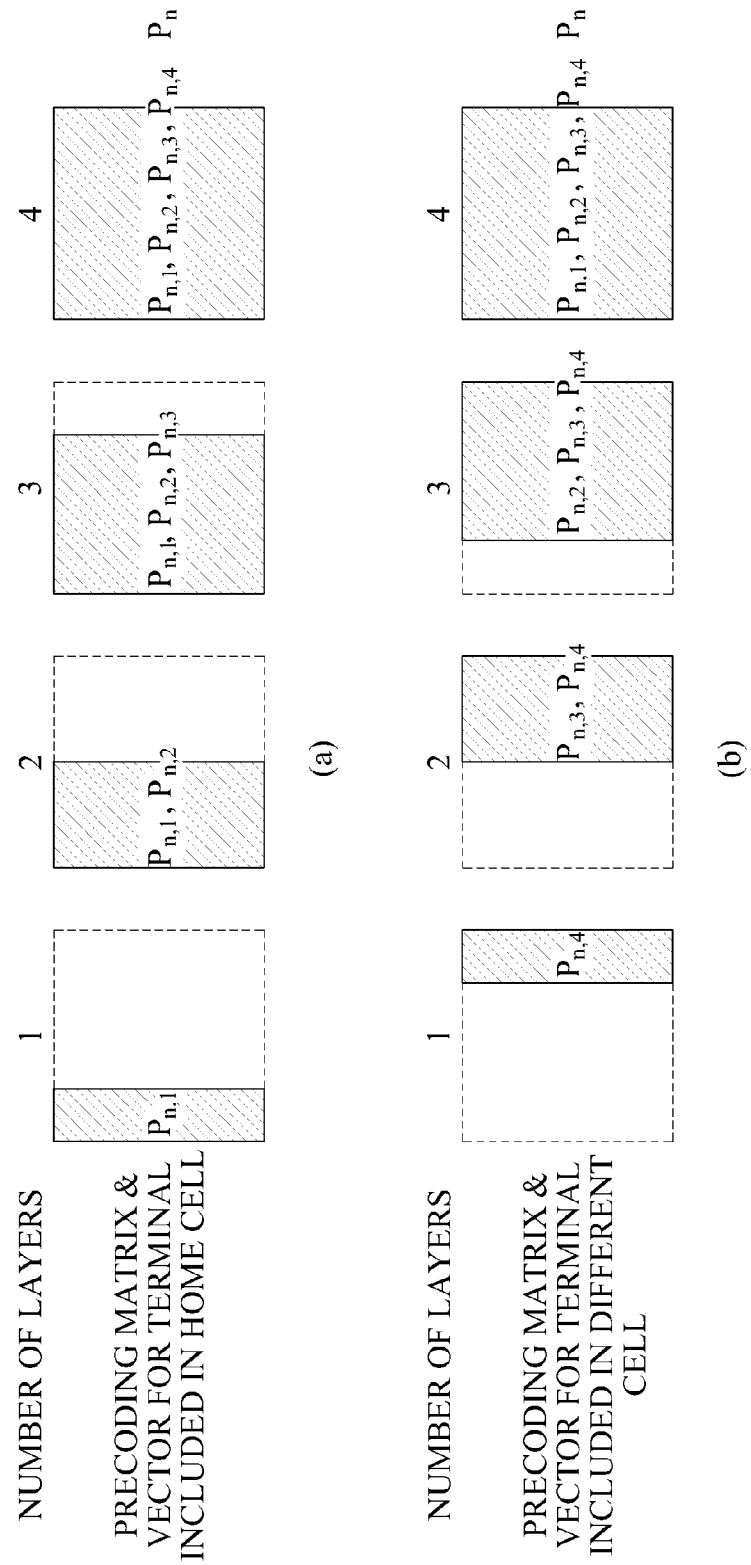
FIG. 1, parts (a) and (b), illustrate an example of designing a precoding matrix when a base station transmits data to a terminal included in a corresponding cell and to another terminal included in a different cell according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Hereinafter, embodiments of the present invention will be described in detail with reference to the accompanying drawings. When it is determined detailed description related to a known function or configuration may render the purpose of the present invention unnecessarily ambiguous in describing the present invention, the detailed description will be omitted here.

Prior to describing the present invention, the term "base station" used herein may indicate the base station or a relay. The invention may be applicable as is with respect to the above two cases. The base station denotes a device that is connected to a backbone network in a wired manner. The relay denotes a device that is connected to the base station in a wired/wireless manner and is subsequently connected to the backbone network.

For ease of description, only an orthogonal frequency division multiple access (OFDMA) system will be described, however, the present invention may be similarly applicable to other systems.

Hereinafter, an environment of applying a precoding based on a codebook in a multiple input multiple output (MIMO) communication system will be described. A codebook S used by a random base station may be expressed by the following Equation 1:

$$S=\{W_n, n=1, 2, \ldots, N\}, \quad \text{[Equation 1]}$$

where $W_n$ denotes an n-th precoding matrix constituting the codebook S. The codebook S may be different or the same for each base station.

To describe a scheme of applying a precoding according to the number of data symbols (hereinafter, the number of layers) that are simultaneously transmitted from a base station to terminals included in a cell of the base station via multiple transmit antennas, a precoding matrix may be defined again using a column vector, and be expressed by the following Equation 2:

$$W_n=[w_{n,1}, w_{n,2}, \ldots, w_{n,L}], n=1,2,\ldots,N, \quad \text{[Equation 2]}$$

where $w_{n,l}$ denotes an l-th column vector of the n-th recoding matrix. Here, $l=1, 2, \ldots, L$.

When it is assumed that the number of layers transmitted from a base station to a terminal included in a cell of the base station is M and the base station uses $l_1, l_2, \ldots, l_M$-th column vectors of the precoding matrix $W_n$, the precoding matrix to be used in the above case may be defined by the following Equation 3:

$$W_n^{(l_1, l_2, \ldots, l_M)} = [w_{n,l_1}, w_{n,l_2}, \ldots, w_{n,l_M}]. \quad \text{[Equation 3]}$$

For ease of description, when it is assumed that the precoding matrix $W_n$ is used to transmit data to the terminal included in the cell of the base station, the first column vector of the precoding matrix $W_n$ is used for a single layer, the first and fourth column vectors are used for two layers, the first, second, and the fourth column vectors are used for three layers, and the first, the second, third, and the fourth column vectors are used for four layers, it may be expressed by the following Equation 4:

$$W_n^{(1)}, W_n^{(1,4)}, W_n^{(1,2,4)}, W_n^{(1,2,3,4)}. \quad \text{[Equation 4]}$$

When the column vectors of the precoding matrix $W_n$ are used in an order of $l_1, l_2, \ldots, l_L$, a precoding matrix $P_n$ may be defined as given by the following Equation 5:

$$P_n \triangleq [w_{n,l_1}, w_{n,l_2}, \ldots, w_{n,l_L}] = [p_{n,1}, p_{n,2}, \ldots, p_{n,L}]. \quad \text{[Equation 5]}$$

When the precoding matrix $P_n$ is defined according to an order of column vectors of a precoding matrix used to transmit data to the terminal included in the cell of the base station, and the number of layers is M, the precoding may be applied using a matrix $[p_{n,1}, P_{n,2}, \ldots, P_{n,M}]$ including first M column vectors of the precoding matrix $P_n$.

Hereinafter, a method of designing a precoding matrix used when a base station transmits data to another terminal included in a different cell will be described with reference to the accompanying drawings.

FIG. 1, parts (a) and (b), illustrate an example of designing a precoding matrix when a base station transmits data to a terminal included in a corresponding cell and another terminal included in a different cell according to an embodiment of the present invention.

Figure 2:
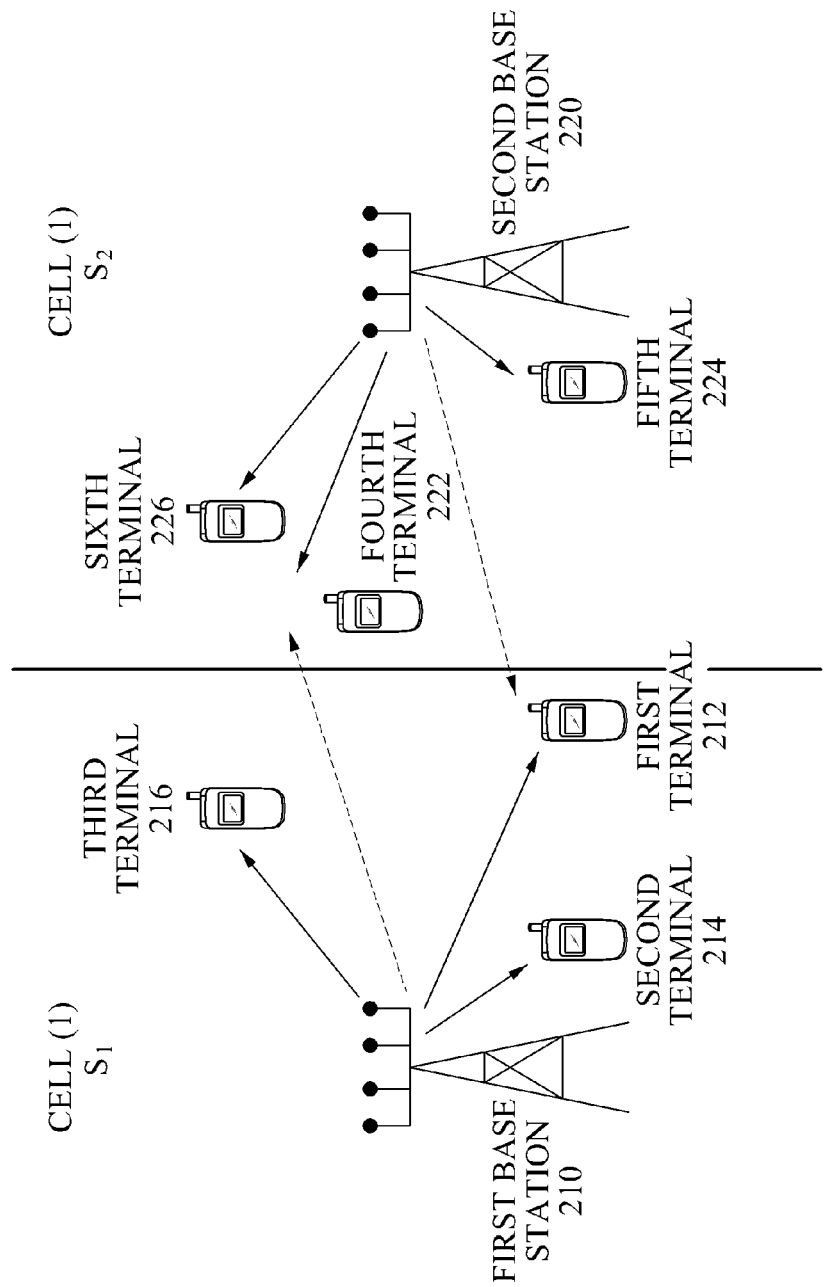
FIG. 2 is a diagram illustrating an example of a cooperative communication according to an embodiment of the present invention.

The part (a) of FIG. 1 illustrates an example where the base station designs the precoding matrix for the terminal included in the cell of the base station, and the part (b) of FIG. 2 illustrates an example where the base station designs the precoding matrix for the other terminal included in the different cell for a cooperative communication.

Specifically, as shown in the part (a) of FIG. 1, when the base station transmits the data to the terminal included in the cell of the base station, the base station may use columns vector in an order of $l_1, l_2, \ldots, l_L$, according to the number of layers with respect to a precoding matrix $W_n$. Also, as shown in the part (b) of FIG. 1, when the base station transmits the data to the other terminal included in the different cell, the base station may use the column vectors in an order of $l_L, l_{L-1}, \ldots, l_1$, which is a reverse order of the part (a).

For example, it is assumed that, when the base station uses the precoding matrix $W_n$ to transmit data to the terminal included in the cell of the base station, and the number of columns of the precoding matrix $W_n$ is four, the base station uses the column vectors of the precoding matrix $W_n$ in an order of 1, 4, 2, and 3 according to the number of layers. With this assumption, when the number of layers required for the terminal to transmit data to the other terminal included in the different cell is one, two, three, and four, a precoding vector or matrix given by the following Equation 4 may be used respectively:

$$W_n^{(3)}, W_n^{(2,3)}, W_n^{(2,3,4)}, W_n^{(1,2,3,4)}. \quad \text{[Equation 6]}$$

Descriptions will be made using the defined precoding matrix $P_n$. Here, when M layers need to be transmitted to the other terminal included in the different cell, the precoding may be applied using last M column vectors $[p_{n,L-M+1}, p_{n,L-M+2}, \ldots, p_{n,L}]$ of the precoding matrix $P_n$.

Hereinafter, a method of feeding back, by a terminal, information associated with a precoding matrix of a base station (hereinafter, a home base station) of a cell (hereinafter, a home cell) including the terminal, and a precoding matrix of a base station (hereinafter, a cooperative base station) of a different cell (hereinafter, a cooperative cell) performing a cooperative communication will be described.

The terminal may measure a signal strength of a signal or channel quality information transmitted from each of base stations and select M base stations with a greatest signal strength to thereby constitute a set of cooperative base stations. Also, the home base station may transmit information associated with the cooperative base stations to the terminal. The channel equality information may include, for example, a signal-to-interference and noise ratio (SINR), a capacity, and the like.

That the terminal determines whether to use the cooperative communication may be similar to the following description. specifically, it may be similar to determine whether to feed back precoding matrix information to only the home base station, or to feed back the precoding matrix information to both the home base station and the cooperative base stations.

Criteria used when the terminal determines whether to use the cooperative communication may follow:

When a value of the channel quality information associated with the home base station, measured by the terminal, is greater than a predetermined reference value, the terminal may feed back precoding matrix information to only the home base station. Conversely, when the measured value of the channel quality information is less than the reference value, the terminal may feed back precoding matrix information to the home base station and the cooperative base stations.

Also, when a value of the channel quality information associated with the cooperative base stations, measured by the terminal, is less than the reference value, the terminal may feed back the precoding matrix information to only the home base station. Conversely, when the measured value of the channel quality information is greater than the reference value, the terminal may feed back precoding matrix information to both the home base station and the cooperative base stations.

Also, whether to use the cooperative communication may be determined based on a precoding matrix feedback indicator transmitted from the base station to the terminal. For example, based on the received precoding matrix feedback indicator, the terminal may feed back precoding matrix information to only the home base station, or may feed back precoding matrix information to both the home base station and the cooperative base stations.

FIG. 2 is a diagram illustrating an example of a cooperative communication according to an embodiment of the present invention.

Referring to FIG. 2, a solid arrow indicator indicates that a base station transmits data to a terminal included in a cell of the base station, and a dotted arrow indicator indicates that the base station transmits data to another terminal included in a different cell for the cooperative communication. Although a single cooperative cell exists in FIG. 2, the present invention may be similarly applicable when a plurality of cooperative cells exists.

In FIG. 2, a first terminal 212, a second terminal 214, and a third terminal 216 may belong to a cell (1) $S_1$. A fourth terminal 222, a fifth terminal 224, and a sixth terminal 226 may belong to a cell (2) $S_2$. Here, a value of channel quality information associated with a home base station for each of the second terminal 214, the third terminal 216, the fifth terminal 224, and the sixth terminal 226 is greater than a predetermined reference value, and thus each of the second terminal 214, the third terminal 216, the fifth terminal 224, and the sixth terminal 226 may receive data from its corresponding home cell. Also, a value of channel quality information associated with the home base station of each of the first terminal 212 and the fourth terminal 222 is less than the reference value, and thus the first terminal 212 and the fourth terminal 222 may simultaneously receive data from its corresponding home base station and cooperative base station.

The second terminal 214 and the third terminal 216 may feed back, to a first base station 210, desired scheduling resource block information, a desired precoding matrix index, the number of layers, and channel quality information. The first terminal 212 may feed back, to the first base station 210 or to the first base station 210 and a second base station 220, the desired scheduling resource block information, desired precoding matrix indexes of the first base station 210 and the second base station 220, the number of layers, the channel quality information, and a cooperative communication indicator. Similar descriptions may be made with respect to the fourth terminal 222, the fifth terminal 224, and the sixth terminal 226 of the second base station 222.

As described above, according to an embodiment of the present invention, each base station may determine which terminal to transmit data to using which resource block, and whether to use a cooperative communication, based on scheduling resource block information, a precoding matrix index, the number of layers, a cooperative communication indicator, and the like, received from terminals. When the cooperative communication is determined to be used, a base station to participate in the cooperative communication may be selected. An indicator requesting the cooperative communication and information required for the cooperative communication may be transferred to the selected base station.

FIG. 3 is a table illustrating terminals that request each corresponding base station to design scheduling for a resource block $k_0$, and feedback information received from the terminals, where a single cooperative base station exists. Although two base stations and a single cooperative base station are considered for ease of description, similar descriptions may be applicable to a case where a plurality of base stations and a plurality of cooperative base stations exist.

Here, it is assumed that a codebook used by the first base station 210 includes $\{W_n, n=1, 2, \ldots, N_1\}$ and a codebook used by the second base station 220 includes $\{V_n, n=1, 2, \ldots, N_2\}$. Here, $N_1$ and $N_2$ may be the same as each other, or may be different from each other. Also, the codebook used by the first base station 210 and the codebook used by the second base station 220 may be the same as each other, or may be different from each other.

As described above, $P_n$ denotes a precoding matrix that is newly defined based on an order of column vectors used according to the number of layers, when the first base station 210 uses the precoding matrix $W_n$ to transmit data to a terminal included in a cell of the first base station 210. Also, $Q_m$ denotes a precoding matrix that is newly defined based on an order of column vectors according to the number of layers, when the second base station 220 uses a precoding matrix $V_m$ to transmit data to a terminal included in a cell of the second base station 220.

Referring to FIG. 3, the first terminal 212 requests a cooperative communication. The first terminal 212 requests the first base station and the second base station 220 to perform a communication using precoding matrices $P_{n0}$ and $Q_{m0}$, respectively. The second terminal 214 requests the first base station 210 to perform the communication using the precoding matrix $P_{n0}$. The third terminal 216 does not request the cooperative communication. The third terminal 216 requests the first base station 210 to perform the communication using the precoding matrix $P_{n1}$. Similar descriptions may be made with respect to the fourth terminal 222, the fifth terminal 224, and the sixth terminal 226.

Referring to FIG. 3, the first base station 210 may transmit data to any one of the first terminal 212, the second terminal 214, and the third terminal 216, with respect to the resource block $k_0$. Also, the fourth terminal 222 included in the second base station 220 requests the cooperative communication. Accordingly, the first base station 210 may simultaneously transmit data to the first terminal 212 and the fourth data 222, requesting the cooperative communication, using the precoding matrix $P_{n0}$. Also, the first base station 210 may simultaneously transmit data to the second terminal 214 and the fourth terminal 222 using the precoding matrix $P_{n0}$.

Hereinafter, a method of calculating, by a terminal, channel quality information with respect to each precoding matrix will be described. The terminal may calculate channel equality information associated with all the precoding matrices with respect to each resource block, and may feed back, to a base station, information associated with a maximum value of channel quality information, resource block information associated with the maximum value, and precoding matrix information. The calculated channel quality information may need to be fed back and be used as reference materials when the base station applies scheduling with respect to a plurality of terminals.

The channel quality information may be calculated by the terminal using various types of schemes. For example, the channel quality information may be calculated with the assumption that column vectors unused by a corresponding terminal in a precoding matrix are unused by other terminals. The terminal may additionally calculate a change amount of the channel quality information that occurs where the column vectors unused by the corresponding terminal are used by other users, and may feed back the calculated change amount to the base station.

As another example, the channel quality information may be calculated with the assumption that column vectors unused by a corresponding terminal in a precoding matrix are used by other terminals. As described above, the terminal may additionally calculate a change amount of the channel quality information that occurs where the column vectors unused by the corresponding terminal are unused by other terminals, and feed back the calculated change amount to the base station.

For further detailed descriptions, a method of calculating channel quality information with the assumption that column vectors unused by a corresponding terminal in a precoding matrix are unused by other terminals will be described below.

Referring to FIG. 3, the first terminal 212 requests the first base station 210 and a cooperative base station to transmit data via a data resource block $k_0$ where M=1 by using an $n_0$-th precoding matrix in the first base station 210 and using an $m_0$-th precoding matrix in the cooperative base station. When each base station allocates the resource block $k_0$ to the first terminal 212, the first terminal 212 may receive, from the first base station 210 corresponding to a home base station, data where precoding $[p_{n,1}, p_{n,2}, \ldots, p_{n,M}]$ is applied to original data, and may also receive, from the second base station 220 corresponding to the cooperative base station, data where precoding $[q_{n,L-M+1}, q_{n,L-M+2}, \ldots, q_{n,L}]$ is applied to original data. In this situation, the channel quality information may be calculated with the assumption that data of any terminal included in a cell of the home base station does not use precoding $[p_{n,M+1}, p_{n,M+2}, \ldots, p_{n,L}]$, and data of any terminal included in the cell of a cooperative base station does not use precoding $[q_{n,1}, q_{n,2}, \ldots, q_{n,L-M}]$.

In addition to the aforementioned schemes, various types of schemes may be used to calculate channel quality information for the cooperative communication. Accordingly, the terminal may calculate channel quality information according to a calculation scheme that is predetermined with the base station, or may feed back, to the base station, calculation scheme information and a value of the channel quality information, or may calculate the channel quality information using a calculation scheme selected by the base station.

Hereinafter, a method of designing a precoding matrix for a cooperative communication in a MIMO communication system, constructed as above, will be described with reference to the accompanying drawings.

Figure 4:
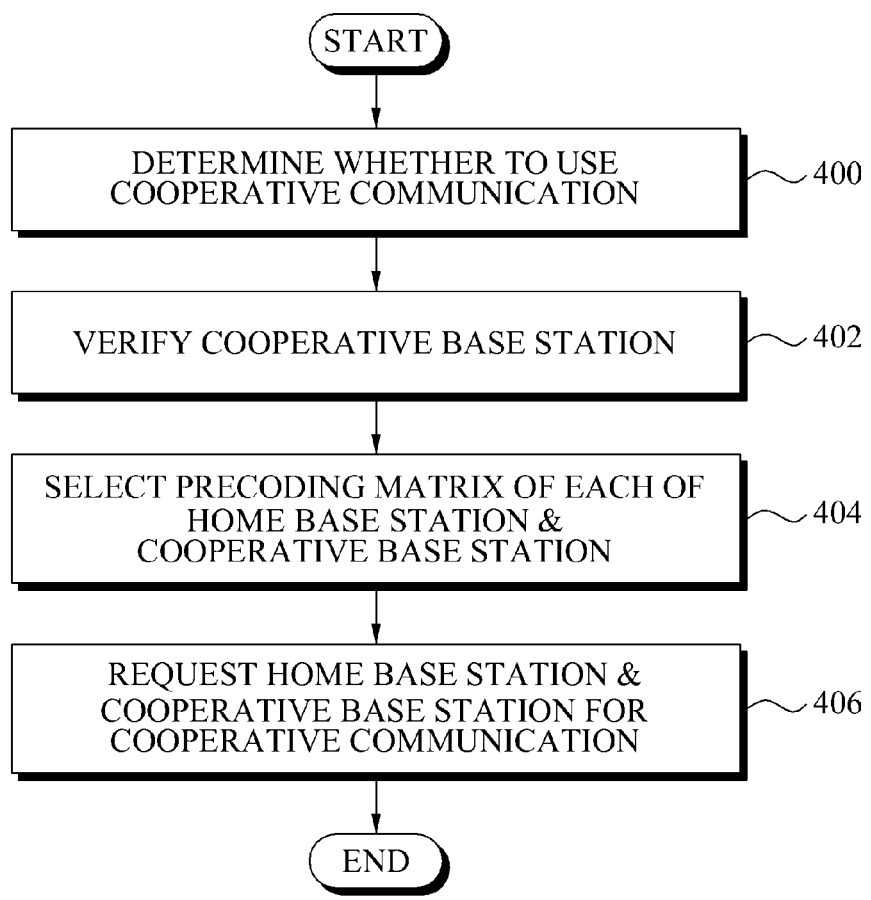
FIG. 4 is a flowchart illustrating a precoding matrix design method for a cooperative communication in a terminal of a multiple input multiple output (MIMO) communication system according to an embodiment of the present invention.

FIG. 4 is a flowchart illustrating a precoding matrix design method for a cooperative communication in a terminal of a MIMO communication system according to an embodiment of the present invention.

Referring to 4, in operation 400, a terminal may determine whether to use a cooperative communication. When a value of channel quality information associated with a home base station, measured by the terminal, is less than a predetermined reference value, the terminal may use the cooperative communication. Also, when a value of channel quality information associated with a cooperative base station, measured by the terminal, is greater than a predetermined reference value, the terminal may use the cooperative communication.

When the terminal determines to use the cooperative communication in operation 400, the terminal may receive information associated with the cooperative base station from the home base station, or may measure a value of channel quality information associated with each of neighboring base stations to verify the cooperative base station in operation 402.

In operation 404, the terminal may calculate channel quality information and select a precoding matrix of each of the home base station and the cooperative base station so that the calculated channel quality information may be maximized. In this instance, the channel quality information may be calculated by selecting the same number of column vectors as the number of layers, sequentially from the first column vector of the precoding matrix of the home base station, and selecting the same number of column vectors as the number of layers, sequentially from the last column vector of the precoding matrix of the cooperative base station, and by precoding the selected column vectors.

When the precoding matrix is selected, the terminal may request only the home base station to perform the cooperative communication using the selected precoding matrix, or may request the home base station and the cooperative base station for the cooperative communication. When the terminal requests only the home base station for the cooperative communication, the home base station may request the cooperative base station to perform the cooperative communication.

When the terminal requests the home base station and the cooperative base station for the cooperative communication, the terminal may transmit, to the home base station and the cooperative base station, a precoding matrix index corresponding to each of the home base station and the cooperative base station, the number of layers, and channel resource information.

Figure 5:
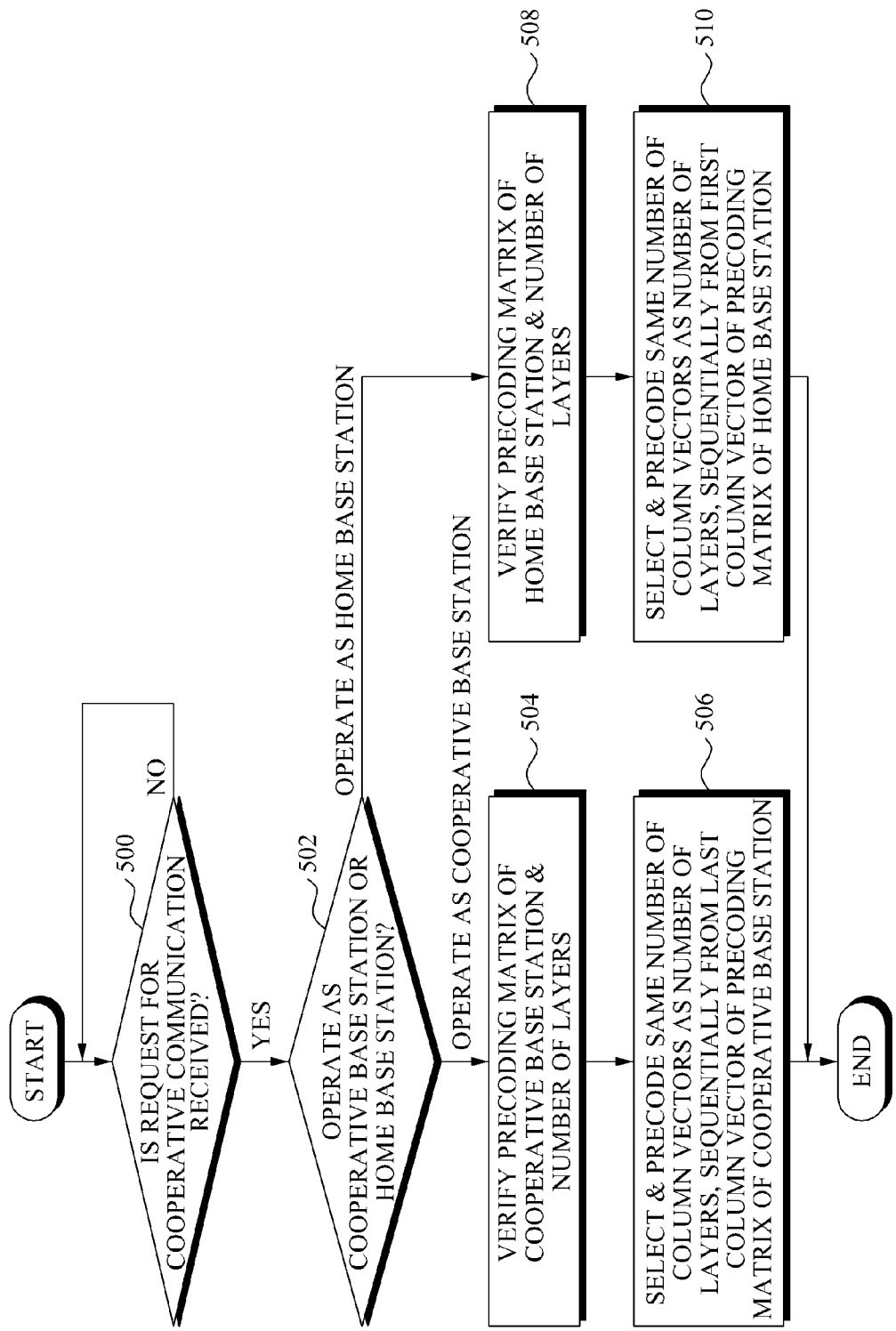
FIG. 5 is a flowchart illustrating a precoding matrix design method for a cooperative communication in a base station of a MIMO communication system according to an embodiment of the present invention.

FIG. 5 is a flowchart illustrating a precoding matrix design method for a cooperative communication in a base station of a MIMO communication system according to an embodiment of the present invention.

Referring to FIG. 5, when the base station receives a request for a cooperative communication in operation 500, the base station may determine whether the request is to operate as a cooperative base station or to operate as a home base station in operation 502.

When the request is to operate as the cooperative communication in operation 502, the base station may verify a precoding matrix of the cooperative base station and the number of layers in operation 504. In operation 506, the base station may select and precode the same number of column vectors as the number of layers, sequentially from the last column vector of the precoding matrix of the cooperative base station.

Here, the request for the cooperative communication may be directly received from the terminal, or may be received via a home base station of the terminal.

When the base station receives the request for the cooperative communication to operate as the cooperative base station, the base station may receive a precoding matrix index of the cooperative base station, the number of layers, and channel resource information.

Conversely, when the request is to operate as the home base station, the base station may verify a precoding matrix of the home base station and the number of layers in operation 508. In operation 510, the base station may select and precode the same number of column vectors as the number of layers, sequentially from the first column vector of the precoding matrix of the home base station.

When the base station receives the request for the cooperative communication to operate as the home base station, the base station may also receive a precoding matrix index of the home base station, the number of layers, and the channel resource information.

Although only the cooperative communication between the base station and the terminal has been described above, the present invention may be applicable to a cooperative communication between a relay and the terminal.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of designing a precoding matrix in a terminal of a multiple input multiple output (MIMO) communication system, the method comprising:
   determining whether to use a cooperative communication;
   verifying a cooperative base station when the cooperative communication is determined to be used;
   selecting a precoding matrix to be applied by a home base station and the cooperative base station; and
   requesting the home base station for the cooperative communication using the selected precoding matrix,
   wherein the selected precoding matrix includes a precoding matrix of the home base station from a codebook of the home base station and a precoding matrix of the cooperative base station from a codebook of the cooperative base station.

2. The method of claim 1, wherein the determining comprises using the cooperative communication when a value of channel quality information associated with the home base station, measured by the terminal, is less than a predetermined reference value.

3. The method of claim 1, wherein the determining comprises using the cooperative communication when a value of channel quality information associated with the cooperative base station, measured by the terminal, is greater than a predetermined reference value.

4. The method of claim 1, wherein the verifying comprises receiving information associated with the cooperative base station from the home base station, or measuring a value of channel quality information associated with each of neighboring base stations to select the cooperative base station.

5. The method of claim 1, wherein the selecting comprises:
   selecting the same number of column vectors as the number of layers, sequentially from the first column vector of the precoding matrix of the home base station, with respect to all the probable combinations of selecting the precoding matrix from each of the codebook of the home base station and the codebook of the cooperative base station; selecting the same number of column vectors as the number of layers, sequentially from the last column vector of the precoding matrix of the cooperative base station;
   precoding the column vectors selected from the precoding matrix of the home base station and the precoding matrix of the cooperative base station; calculating channel quality information; and
   selecting the precoding matrix of each of the home base station and the cooperative base station to maximize the calculated channel quality information.

6. The method of claim 5, further comprising: calculating a change amount of the channel quality information, where all the unselected column vectors are used for a corresponding base station to transmit data to another terminal; and feeding back, to the home base station, a maximum value of the channel quality information, information associated with the precoding matrices to be applied by the home base station and the cooperative base station to obtain the maximum value of the channel quality information, and the calculated change amount of the channel quality information.

7. The method of claim 5, wherein the calculating comprises: calculating the channel quality information, where column vectors, unused by the terminal in the precoding matrices of the home base station and the cooperative base station, are used by other terminals included in the home base station and the cooperative base station; and calculating a change amount of the channel quality information that occurs where the column vectors unused by the terminal are unused by the other terminals.

8. The method of claim 5, wherein the calculating comprises: calculating the channel quality information, where column vectors, unused by the terminal in the precoding matrices of the home base station and the cooperative base station, are unused by other terminals included in the home base station and the cooperative base station; and calculating a change amount of the channel quality information that occurs where the column vectors unused by the terminal are used by the other terminals.

9. The method of claim 1, wherein the requesting comprises: requesting the home base station to select and precode the same number of column vectors as the number of layers, sequentially from the first column vector of the selected precoding matrix of the home base station; and requesting the cooperative base station to select and precode the same number of column vectors as the number of layers, sequentially from the last column vector of the selected precoding matrix of the cooperative base station.

10. The method of claim 1, wherein the requesting comprises requesting the home base station and the cooperative base station for the cooperative communication by transmitting, to the home base station and the cooperative base station, a corresponding precoding matrix index, the number of layers, and channel resource information.

11. The method of claim 1, wherein: the requesting comprises requesting the home base station and the cooperative base station for the cooperative communication, or when the cooperative communication is requested to the home base station, the requesting comprises making the home base station request the cooperative base station for the cooperative communication.

12. A method of designing a precoding matrix in a base station of a MIMO communication system, the method comprising:

receiving a request for a cooperative communication;

verifying a precoding matrix of a cooperative base station from a codebook of the cooperative base station and the number of layers, when the request is to operate as the cooperative base station; and selecting and precoding the same number of column vectors as the number of layers, sequentially from the last column vector of the precoding matrix of the cooperative base station from a codebook of the cooperative base station.

13. The method of claim 12, wherein the receiving comprises receiving the request for the cooperative communication from a terminal or via a home base station of the terminal.

14. The method of claim 12, wherein the receiving comprises receiving a precoding matrix index of the cooperative base station, the number of layers, and channel resource information, when the base station operates as the cooperative base station.

15. The method of claim 12, further comprising: verifying a precoding matrix of a home base station and the number of layers when the request is to operate as the home base station; and selecting and precoding the same number of column vectors as the number of layers, sequentially from the first column vector of the precoding matrix of the home base station.

16. The method of claim 15, wherein the receiving comprises receiving a precoding matrix index of the home base station, the number of layers, and channel resource information, when the base station operates as the home base station.

* * * * *